United States Patent
Kawawa

(10) Patent No.: US 10,536,631 B2
(45) Date of Patent: Jan. 14, 2020

(54) VIDEO DISPLAY APPARATUS AND CONTROL METHOD OF VIDEO DISPLAY APPARATUS

(71) Applicant: CANON KABUSHIKI KAISHA, Tokyo (JP)

(72) Inventor: Yasuhiro Kawawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 15/935,235

(22) Filed: Mar. 26, 2018

(65) Prior Publication Data

US 2018/0288314 A1 Oct. 4, 2018

(30) Foreign Application Priority Data

Mar. 31, 2017 (JP) ................. 2017-072081

(51) Int. Cl.
- *H04N 5/232* (2006.01)
- *H04N 5/272* (2006.01)
- *H04N 7/18* (2006.01)

(52) U.S. Cl.
CPC ..... *H04N 5/23225* (2013.01); *H04N 5/23296* (2013.01); *H04N 5/272* (2013.01); *H04N 7/183* (2013.01)

(58) Field of Classification Search
CPC .......... H04N 5/23225; H04N 5/23206; H04N 5/232945; H04N 5/23293; H04N 7/183; H04N 5/23296; H04N 5/272
See application file for complete search history.

(56) References Cited

U.S. PATENT DOCUMENTS

| 6,680,746 B2 | 1/2004 | Kawai et al. |
| 9,628,688 B2* | 4/2017 | Martin ............... G01P 15/00 |
| 10,277,794 B2* | 4/2019 | Ikegami ............. H04N 5/23245 |
| 2003/0103063 A1 | 6/2003 | Mojaver et al. |
| 2004/0201677 A1* | 10/2004 | Bronson .......... G08B 13/19663 348/207.1 |
| 2011/0317011 A1* | 12/2011 | Kono .................... H04N 7/183 348/143 |

(Continued)

FOREIGN PATENT DOCUMENTS

| EP | 1950954 A1 | 7/2008 |
| JP | 2016-063397 A | 4/2016 |

OTHER PUBLICATIONS

European Search Report dated Aug. 28, 2108, which is enclosed, that issued in the corresponding European Patent Application No. 18160525.4.

(Continued)

*Primary Examiner* — Shahbaz Nazrul

(74) *Attorney, Agent, or Firm* — Cowan, Liebowitz & Latman, P.C.

(57) ABSTRACT

A video display apparatus comprises an obtaining unit configured to obtain installation data representing an installation condition of a camera; an accepting unit configured to accept a movement of a cut position of a cut video obtained by cutting a part of a video captured by the camera; and a control unit configured to, based on the installation data, switch an image representing a moving direction of the cut position on the video in a case in which the movement is accepted by the accepting unit and superimpose the image on the video.

16 Claims, 13 Drawing Sheets

(56) References Cited

U.S. PATENT DOCUMENTS

| | | | |
|---|---|---|---|
| 2012/0007999 A1* | 1/2012 | Horii | H04N 5/232 348/211.4 |
| 2012/0057037 A1 | 3/2012 | Ono | |
| 2012/0120237 A1 | 5/2012 | Trepess | |
| 2013/0293672 A1* | 11/2013 | Suzuki | H04N 5/23238 348/36 |
| 2016/0028951 A1* | 1/2016 | Mayuzumi | G06K 9/00335 348/36 |
| 2017/0150031 A1* | 5/2017 | Oshima | G03B 17/02 |

OTHER PUBLICATIONS

Sep. 24, 2018 Singaporean Office Action, which is enclosed without an English Translation, that issued in Singaporean Patent Application No. 10201802570X.

* cited by examiner

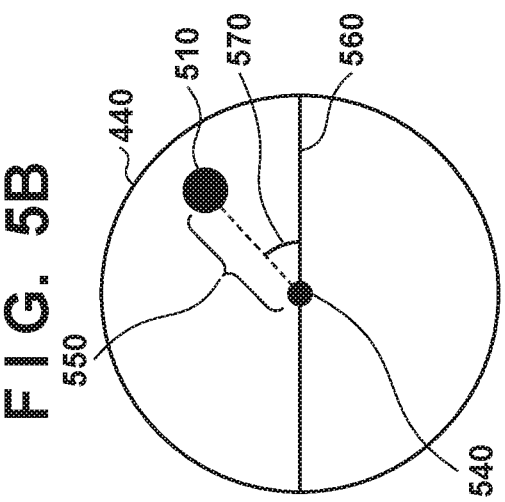
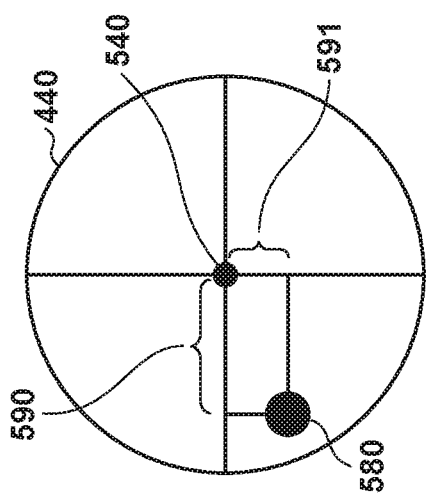
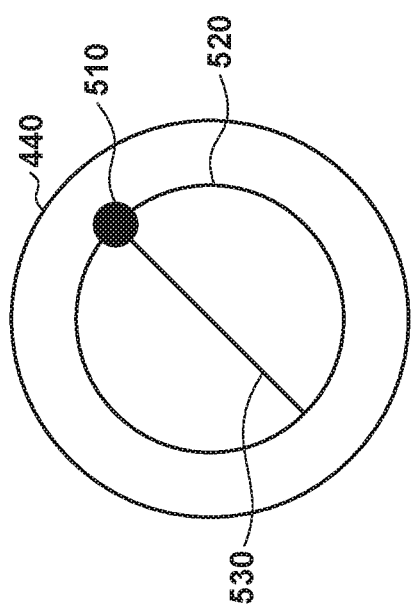
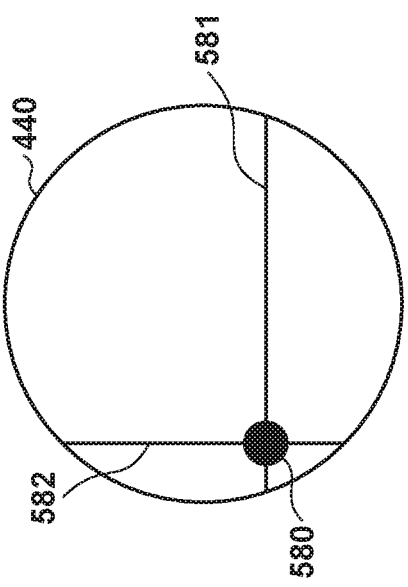

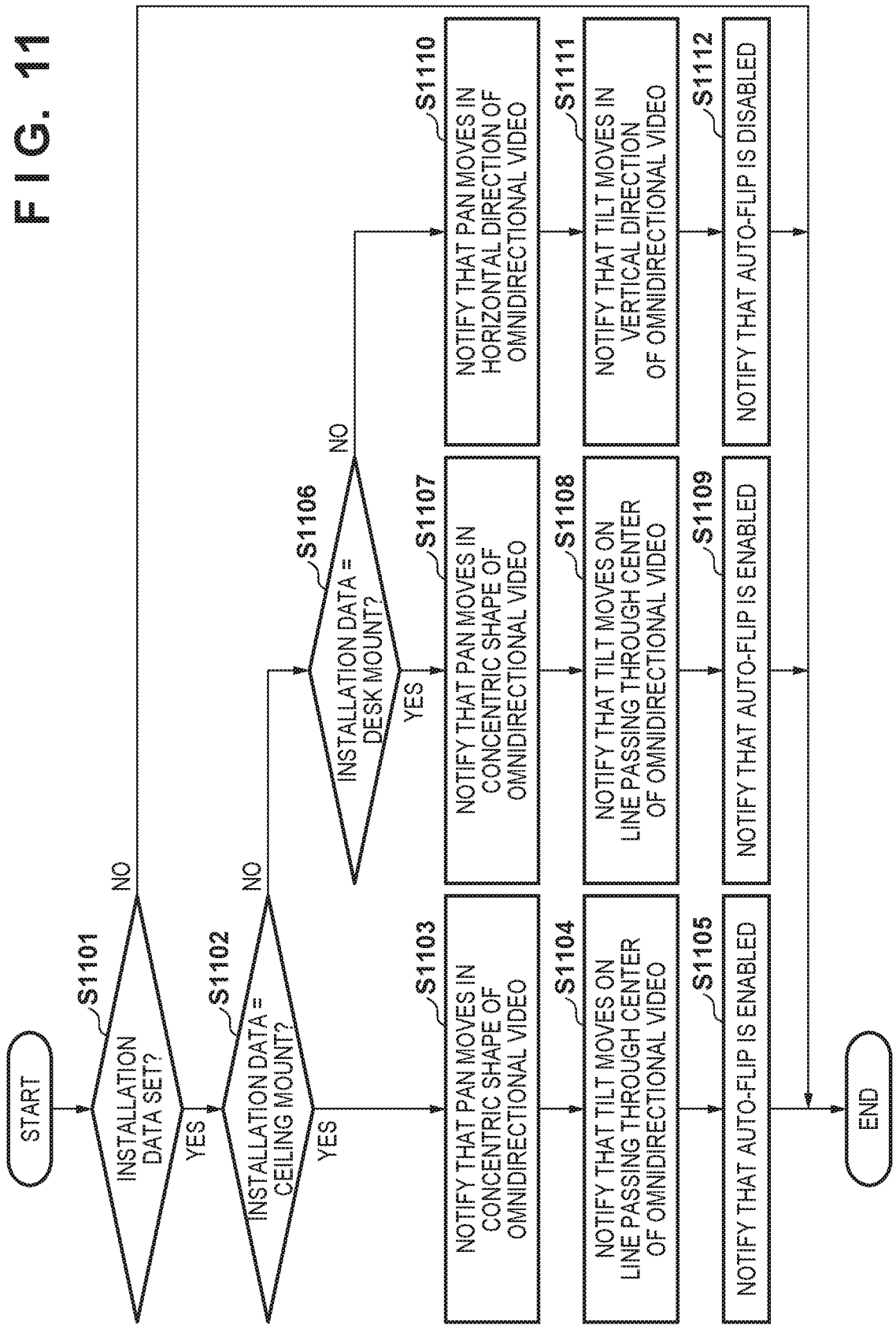

VIDEO DISPLAY APPARATUS AND CONTROL METHOD OF VIDEO DISPLAY APPARATUS

BACKGROUND OF THE INVENTION

Field of the Invention

The present invention relates to a video display apparatus and a control method of the video display apparatus.

Description of the Related Art

Along with a recent growth of the network camera market, various kinds of network cameras have been manufactured. One of the network cameras is an omnidirectional network camera (to be also referred to as an omnidirectional camera hereinafter) including a fish-eye lens and capable of looking out over the periphery of 360 degrees without any blind spot.

The omnidirectional camera is generally used by displaying side by side a "fish-eye video (omnidirectional video)" that displays a whole sight and a "cut video" obtained by cutting a region to be particularly closely observed. In the side-by-side display, the positional relationship between the fish-eye video and the cut video is hard to grasp. On the other hand, Japanese Patent Laid-Open No. 2016-63397 discloses a technique of displaying which part of a fish-eye video is cut to obtain a cut video.

On the other hand, when a monitoring target moves, the person in charge of monitoring follows the monitoring target by performing a pan/tilt operation for the cut position. At this time, in a case in which the omnidirectional camera is installed on the ceiling, when the pan operation is performed for the cut video, the cut position moves on the fish-eye video along the circumference of a circle with a radius between the current cut position and the fish-eye center. When the tilt operation is performed, the cut position moves on a line that connects the current position and the fish-eye center. On the other hand, in a case in which the omnidirectional camera is installed on the wall, when the pan operation is performed for the cut video, the cut position moves on the fish-eye video in the horizontal direction on the image. When the tilt operation is performed, the cut position moves in the vertical direction on the fish-eye video.

In the technique described in Japanese Patent Laid-Open No. 2016-63397, since the pan/tilt moving direction changes in accordance with the installation condition of the omnidirectional camera, it is difficult to intuitively grasp the direction in which the cut position moves on the fish-eye video (omnidirectional video).

SUMMARY OF THE INVENTION

The present invention provides a technique for easily grasping the movement of a cut position on a video.

According to one aspect of the present invention, there is provided a video display apparatus comprising: an obtaining unit configured to obtain installation data representing an installation condition of a camera; an accepting unit configured to accept a movement of a cut position of a cut video obtained by cutting a part of a video captured by the camera; and a control unit configured to, based on the installation data, switch an image representing a moving direction of the cut position on the video in a case in which the movement is accepted by the accepting unit and superimpose the image on the video.

According to another aspect of the present invention, there is provided a control method of a video display apparatus including an accepting unit configured to accept a movement of a cut position of a cut video obtained by cutting a part of a video captured by a camera, the method comprising: obtaining installation data representing an installation condition of the camera; and switching an image representing a moving enable direction of the cut position on the video in a case in which the movement is accepted by the accepting unit and superimposing the image on the video based on the installation data.

Further features of the present invention will become apparent from the following description of exemplary embodiments with reference to the attached drawings.

BRIEF DESCRIPTION OF THE DRAWINGS

FIGS. 5A to 5D are views showing examples of image data 440 captured by the monitoring camera;

FIG. 11 is a flowchart showing the procedure of processing of notifying enabling/disabling of auto-flip;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

<Outline>

In this embodiment, an example in which an image (display form) representing the moving direction of a cut position on an omnidirectional video is switched based on installation data (ceiling mount, desk mount, wall mount, and the like) representing the installation condition of a camera and superimposed on the omnidirectional video will be described. Note that although an omnidirectional video that is a video captured via a fish-eye lens will be exemplified, this embodiment is applicable to another video as well. For example, this embodiment is applicable to a video captured via a normal lens. In addition, this embodiment is applicable to a panoramic image that is an image formed by connecting a plurality of videos.

More specifically, if the installation condition is ceiling mount or desk mount, as an image (display form) in a case in which the cut position of a cut video obtained by cutting a part of an omnidirectional video is moved by a pan operation, a concentric auxiliary line with respect to the center position of the omnidirectional video as a reference is superimposed on the omnidirectional video. In addition, as an image (display form) in a case in which the cut position of the cut video is moved by a tilt operation, a linear auxiliary line passing through the center position of the omnidirectional video and the cut position of the cut video is superimposed on the omnidirectional video. Here, a case in which the installation condition is ceiling mount is a case in which a camera is installed on a ceiling or the like so as to observe the lower side from above. Additionally, a case in which the installation condition is desk mount is a case in which a camera is installed on a desk or the like so as to observe the upper side from below.

On the other hand, if the installation condition is wall mount, as an image (display form) in a case in which the cut position of a cut video is moved by a pan operation, a horizontal linear auxiliary line is superimposed on the omnidirectional video. In addition, as an image (display form) in a case in which the cut position of the cut video is moved by a tilt operation, a vertical linear auxiliary line is superimposed on the omnidirectional video. Here, a case in which the installation condition is wall mount is a case in which a camera is installed on a wall or the like so as to observe in the horizontal direction.

<Arrangement of Monitoring Camera System>

Figure 1:
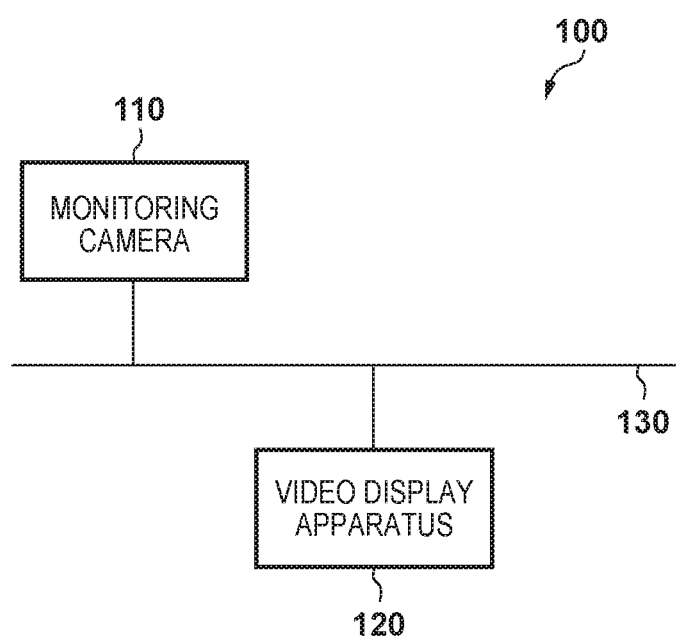
FIG. 1 is a view showing an example of the arrangement of a monitoring camera system.

FIG. 1 is a view showing an example of the arrangement of a monitoring camera system according to the first embodiment of the present invention. As shown in FIG. 1, a monitoring camera system 100 includes a monitoring camera 110, a video display apparatus 120, and a network 130. The monitoring camera 110 distributes image data of a captured image via the network 130.

The video display apparatus 120 accesses the monitoring camera 110 and changes the setting of the monitoring camera 110, processes image data obtained as a result of capturing by the monitoring camera 110, or processes accumulated image data or the like and displays an image based on the processed image data. Note that in the monitoring camera system 100 shown in FIG. 1, only the video display apparatus 120 is illustrated as a client. However, another client that accesses the monitoring camera 110 and receives or accumulates image data may be provided in addition to the video display apparatus 120.

The network 130 is formed from a plurality of routers, switches, and cables that communicably connect the monitoring camera 110 and the video display apparatus 120 and satisfy a communication standard such as Ethernet®. Note that the communication standard, scale, and configuration of the network 130 are not particular limited as long as it allows the monitoring camera 110 and the video display apparatus 120 to do communication without any problem. Hence, networks in a wide range from the Internet to a LAN (Local Area Network) are applicable as the network 130.

<Hardware Arrangement of Monitoring Camera>

Figure 2:
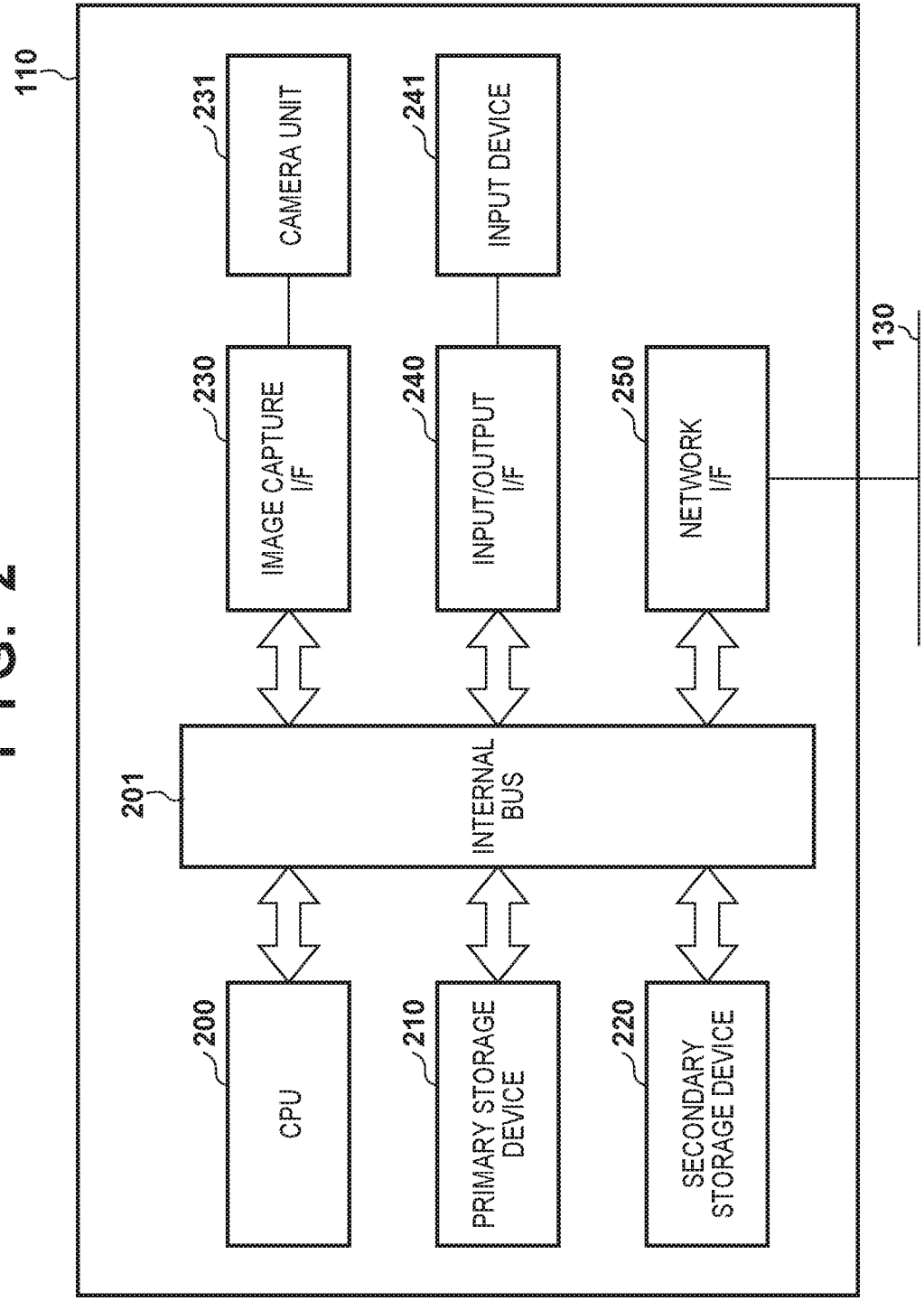
FIG. 2 is a block diagram showing an example of the hardware arrangement of a monitoring camera.

FIG. 2 is a block diagram showing an example of the hardware arrangement of the monitoring camera 110. An internal bus 201 is formed in the monitoring camera 110. The monitoring camera 110 includes a CPU 200, a primary storage device 210, a secondary storage device 220, and various kinds of I/Fs 230 to 250, which are connected to the internal bus 201. More specifically, in the monitoring camera 110, the image capture I/F 230, the input/output I/F 240, and the network I/F 250 are formed as the various kinds of I/Fs. In addition, the monitoring camera 110 includes a camera unit 231 connected to the image capture I/F 230, and an input device 241 connected to the input/output I/F 240.

The CPU 200 generally controls the operation of the monitoring camera 110. The primary storage device 210 is a high-speed writable storage device represented by, for example, a RAM. For example, an OS (Operating System), various kinds of programs, various kinds of data, and the like are loaded into the primary storage device 210. The primary storage device 210 is also used as a work area when the CPU 200 executes the OS, the various kinds of programs, and the like.

The secondary storage device 220 is a nonvolatile storage device represented by, for example, an FDD or HDD, a flash memory, a CD-ROM drive, or the like. The secondary storage device 220 is used as a permanent storage area for the OS, various kinds of programs, various kinds of data, and the like and is also used as a short-term storage area for various kinds of data and the like.

The image capture I/F 230 converts/compresses the image data of an image captured by the connected camera unit 231 into a predetermined format and transfers it to, for example, the secondary storage device 220. Note that the transfer destination may be the primary storage device 210. The camera unit 231 is a capturing unit configured to be able to change the angle of view of capturing or the zoom position.

The input/output I/F 240 accepts a signal/interruption from the outside via the connected input device 241 or outputs a signal to the outside. The network I/F 250 is an interface used to connect the network 130 shown in FIG. 1, and communicates with the video display apparatus 120 and the like via the network 130.

<Hardware Arrangement of Video Display Apparatus>

Figure 3:
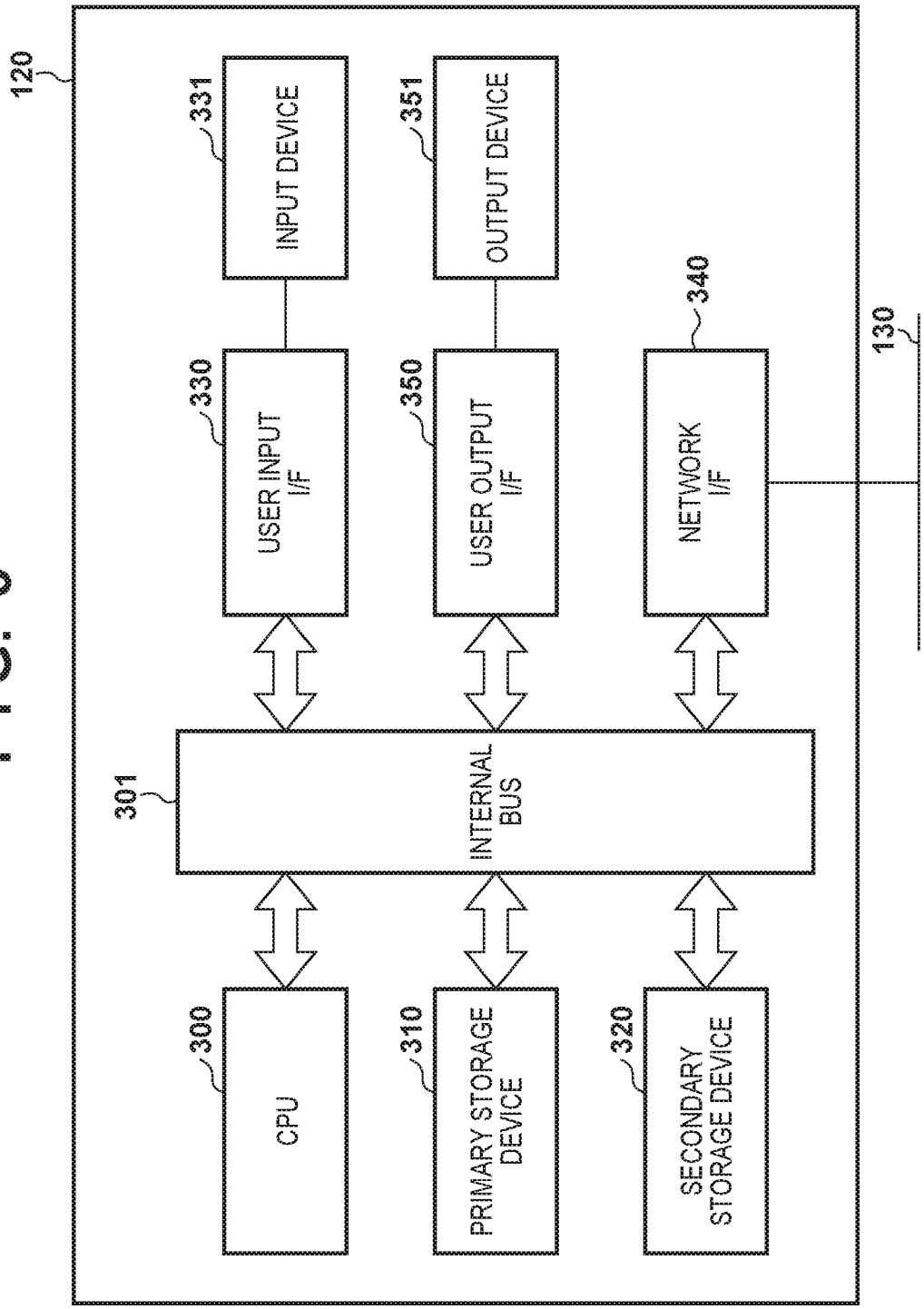
FIG. 3 is a block diagram showing an example of the hardware arrangement of a video display apparatus.

FIG. 3 is a block diagram showing an example of the hardware arrangement of the video display apparatus 120. An internal bus 301 is formed in the video display apparatus 120. The video display apparatus 120 includes a CPU 300, a primary storage device 310, a secondary storage device 320, a user input I/F 330, a network I/F 340, and a user output I/F 350, which are connected to the internal bus 301. In addition, video display apparatus 120 includes an input device 331 connected to the user input I/F 330, and an output device 351 connected to the user output I/F 350.

The CPU 300 generally controls the operation of the video display apparatus 120. The primary storage device 310 is a high-speed writable storage device represented by, for example, a RAM. For example, an OS, various kinds of programs, various kinds of data, and the like are loaded into the primary storage device 310. The primary storage device 310 is also used as a work area when the CPU 300 executes the OS, the various kinds of programs, and the like.

The secondary storage device 320 is a nonvolatile storage device represented by, for example, an FDD or HDD, a flash memory, a CD-ROM drive, or the like. The secondary storage device 320 is used as a permanent storage area for the OS, various kinds of programs, various kinds of data, and the like and is also used as a short-term storage area for various kinds of data and the like.

The user input I/F 330 accepts an input via the connected input device 331. The input device 331 is an input device formed from, for example, a keyboard and a mouse. The network I/F 340 is an interface used to connect the network 130 shown in FIG. 1, and communicates with the monitoring camera 110 and the like via the network 130. The user output I/F 350 performs output to the connected output device 351. The output device 351 is, for example, an image display device such as a display.

<Functional Arrangement of Monitoring Camera>

Figure 4A:
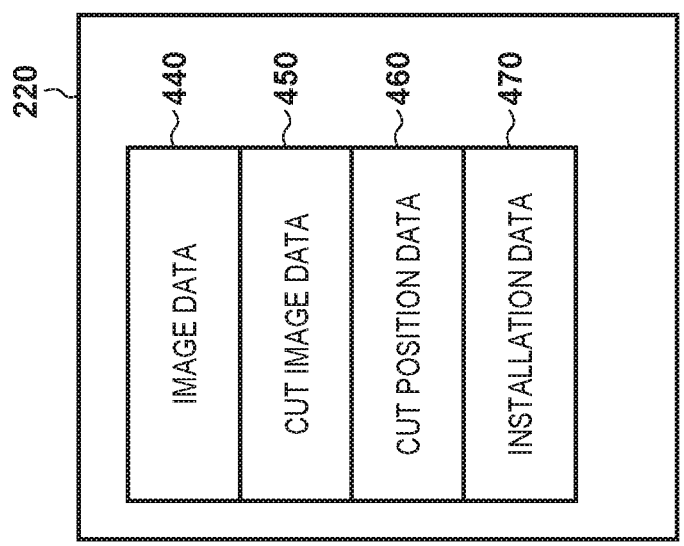
FIGS. 4A and 4B are views showing examples of processing units and various kinds of data of the monitoring camera.
Figure 4B:
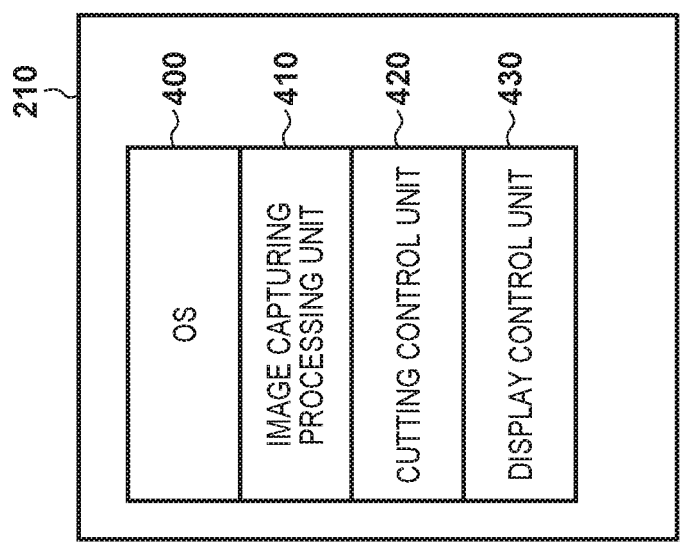

FIGS. 4A and 4B are views showing examples of the functions of various kinds of processing units, various kinds of data, and the like stored in the primary storage device 210 and the secondary storage device 220 of the monitoring camera 110 shown in FIG. 2. More specifically, FIG. 4A shows various kinds of processing units and the like corresponding to programs stored in the primary storage device 210 of the monitoring camera 110 shown in FIG. 2, and FIG. 4B shows various kinds of data and the like stored in the secondary storage device 220 of the monitoring camera 110 shown in FIG. 2. As shown in FIG. 4B, the secondary storage device 220 stores image data 440, cut image data 450, cut position data 460, and installation data 470 (details of each data will be described later).

As shown in FIG. 4A, an OS 400, a program functioning as an image capturing processing unit 410, a program functioning as a cutting control unit 420, and a program functioning as a display control unit 430 are loaded into the primary storage device 210. However, the programs functioning as the cutting control unit 420 and the display control unit 430 need not always be provided in the primary storage device 210 of the monitoring camera 110. They may be provided in, for example, the primary storage device 310 of the video display apparatus 120, as will be described later.

The OS 400 is a basic program configured to control the entire monitoring camera 110. Here, the positions (addresses) and sizes of various kinds of programs in the primary storage device 210 are managed by the OS 400.

The image capturing processing unit 410 performs processing of capturing of an image by the camera unit 231, and also performs processing of an image captured by the camera unit 231 based on a received event. For example, upon receiving an image capture end event from the camera unit 231, the image capturing processing unit 410 performs processing of obtaining, via the image capture I/F 230, the image data of an image captured by the camera unit 231. The image capturing processing unit 410 then performs processing of converting/compressing the obtained image data into a predetermined format and saving it as the captured image data 440 in the secondary storage device 220.

In addition, upon receiving, via the network 130, a delivery request event from the video display apparatus 120 that is an external apparatus, the image capturing processing unit 410 performs processing of delivering the captured image data 440 saved in the secondary storage device 220 to the video display apparatus 120. In this way, the image capturing processing unit 410 receives an event to, for example, manage the captured image data 440, thereby performing processing from capturing of an image by the camera unit 231 of the monitoring camera 110 to distribution of image data via the network 130.

The cutting control unit 420 requests the image capturing processing unit 410 to change the cut position and size. The image capturing processing unit 410 cuts an image based on the requested size and position and saves the image in the secondary storage device 220. At this time, the cutting control unit 420 decides, based on the cut position data 460, which position on an omnidirectional video (fish-eye video) is to be cut. Then, the image capturing processing unit 410 creates an image with little distortion. Upon receiving, via the network 130, a delivery request event from the video display apparatus 120 that is an external apparatus, the image capturing processing unit 410 performs processing of delivering the cut image data 450 saved in the secondary storage device 220 to the video display apparatus 120.

In addition, when the cutting control unit 420 receives a request event to change the cut position from the video display apparatus 120 that is an external apparatus, the cut position data 460 is updated based on the information of the request event. The image capturing processing unit 410 generates the cut image data 450 based on the updated cut position data 460.

The cutting control unit 420 also manages a coordinate system that accepts control of the cut position by referring to the installation data 470. In a case of an omnidirectional camera, the coordinate system is switched in accordance with the installation condition. In a case of ceiling mount, when a pan operation is performed for the cut video, the cut position moves on the omnidirectional video (fish-eye video) along the circumference of a circle with a radius corresponding to the length from the fish-eye center to the current cut position. When a tilt operation is performed, the cut position moves on a line passing through the current position and the fish-eye center. On the other hand, in a case of wall mount, when a pan operation is performed for the cut video, the cut position moves on the omnidirectional video (fish-eye video) in the horizontal direction on the image. In a case of a tilt operation, the cut position moves in the vertical direction on the fish-eye video. To switch the pan/tilt control direction in accordance with the installation condition of the omnidirectional camera in this way, the cutting control unit 420 refers to the installation data 470 and switches the coordinate system of cutting control. In addition, the cutting control unit 420 notifies the video display apparatus 120 of the current state of the coordinate system.

As described above, to manage cutting control, the cutting control unit 420 performs various processes of, for example, accepting a cut position change, managing the coordinate system, and requesting a cut image from the image capturing processing unit 410.

In accordance with a request from the video display apparatus 120 that is an external apparatus, the display control unit 430 superimposes an image (display form) representing the current cut position and the direction in which the cut position moves on the image data 440 based on the cut position data 460.

As shown in FIG. 4B, the secondary storage device 220 of the monitoring camera 110 stores the image data 440, the cut image data 450, and the cut position data 460. However, the image data 440, the cut image data 450, and the cut position data 460 need not always exist in the secondary storage device 220 of the monitoring camera 110. They may exist in, for example, the secondary storage device 320 of the video display apparatus 120 to be described later.

The image data 440 is image data captured by the camera unit 231 and processed by the image capturing processing unit 410. The cut image data 450 is image data created by processing of the cutting control unit 420. The cut position data 460 includes the coordinates of the center position of a cut image. Details of information saved as the cut position data 460 will be described later with reference to FIGS. 5A to 5D.

The installation data 470 is the information of an installation condition corresponding to one of ceiling mount representing installation on a ceiling, wall mount representing installation on a wall, and desk mount representing installation on a desk. The installation condition may be set in the monitoring camera 110 by the user, may be obtained by image processing using an image captured by the monitoring camera 110, or may be obtained by a gyro or the like connected to the monitoring camera 110.

<Examples of GUIs>

Here, FIG. 5A shows an example of an image (display form) representing the moving direction of the cut position of a cut video superimposed on the image data 440 in a case in which an omnidirectional video captured by an omnidirectional camera is the image data 440, and the installation condition is ceiling mount or desk mount. Based on the cut position data 460 and the installation data 470, the display control unit 430 displays a cut center position 510 superimposed on the image data 440. Next, the display control unit 430 displays lines (a pan auxiliary line 520 and a tilt auxiliary line 530) representing the horizontal direction and the vertical direction of the cut video in a superimposed manner as an image (display form) representing the moving direction of the cut position. At this time, the pan auxiliary line 520 representing the horizontal direction of the cut video is drawn as a circle having the center at the center of the image data 440 and a radius corresponding to the distance from the center of the image data 440 to the center of the cut position. In addition, the tilt auxiliary line 530 representing the vertical direction of the cut video is drawn as a line segment passing through the center of the image data 440 and the center of the cut position.

FIG. 5B shows an example of information saved as the cut position data 460. For example, when the image data 440 is a fish-eye video captured by the omnidirectional camera, a distance 550 between center coordinates 540 of the image data 440 and the cut center position 510, and an angle 570 between a reference line 560 that connects the center coordinates 540 of the image data 440 and one point on a horizontal line of the image data 440 and a line segment that connects the center coordinates 540 of the image data 440 and the cut center position 510 are saved as the cut position data 460.

Next, FIG. 5C shows an example of an image (display form) representing the moving direction of the cut position of a cut video superimposed on the image data 440 in a case in which an omnidirectional video captured by an omnidirectional camera is the image data 440, and the installation condition is wall mount. Based on the cut position data 460 and the installation data 470, the display control unit 430 displays a cut center position 580 superimposed on the image data 440. Next, the display control unit 430 displays lines (a pan auxiliary line 581 and a tilt auxiliary line 582) representing the horizontal direction and the vertical direction of the cut video in a superimposed manner as an image (display form) representing the direction in which the cut position moves. At this time, the pan auxiliary line 581 representing the horizontal direction of the cut video is drawn as a line passing through the cut center position 580 in the horizontal direction of the image data 440. In addition, the tilt auxiliary line 582 representing the vertical direction of the cut video is drawn as a line passing through the cut center position 580 in the vertical direction of the image data 440.

FIG. 5D shows an example of information saved as the cut position data 460. For example, when the image data 440 is a fish-eye video captured by the omnidirectional camera, a distance 590 between the center coordinates 540 of the image data 440 and the cut center position 580 in the horizontal direction, and a distance 591 in the vertical direction are saved as the cut position data 460.

<Functional Arrangement of Video Display Apparatus>

Figure 6A:
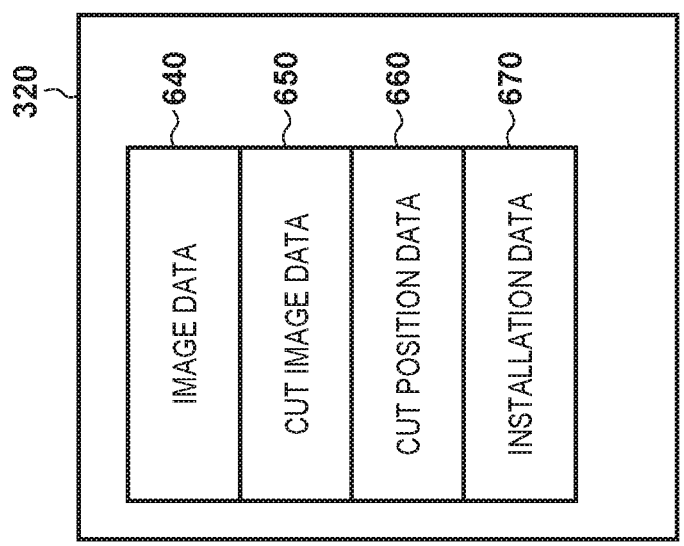
FIGS. 6A and 6B are views showing examples of processing units and various kinds of data of the video display apparatus.
Figure 6B:
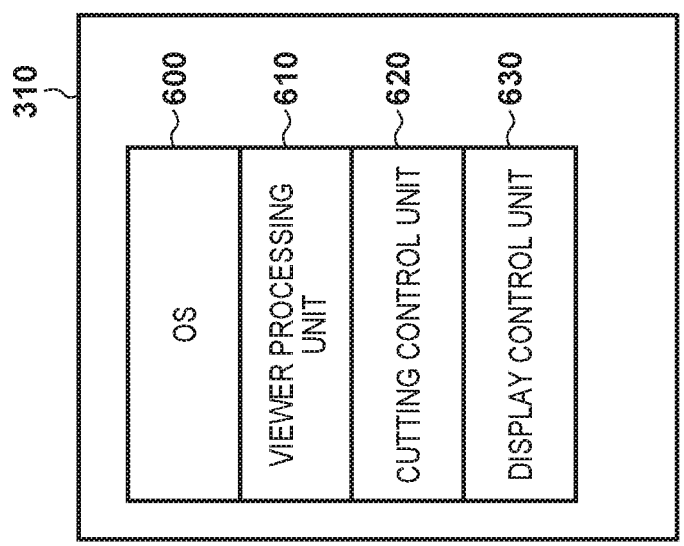

FIGS. 6A and 6B are views showing examples of the functions of various kinds of processing units, various kinds of data, and the like stored in the primary storage device 310 and the secondary storage device 320 of the video display apparatus 120 shown in FIG. 3. More specifically, FIG. 6A shows various kinds of processing units and the like corresponding to programs stored in the primary storage device 310 of the video display apparatus 120 shown in FIG. 3, and FIG. 6B shows various kinds of data and the like stored in the secondary storage device 320 of the video display apparatus 120 shown in FIG. 3. As shown in FIG. 6B, the secondary storage device 320 stores image data 640, cut image data 650, cut position data 660, and installation data 670 (details of each data will be described later).

As shown in FIG. 6A, an OS 600, and programs functioning as a viewer processing unit 610, a cutting control unit 620, and a display control unit 630 are loaded into the primary storage device 310. The OS 600 is a basic program configured to control the entire video display apparatus 120. Here, the positions (addresses) and sizes of various kinds of programs in the primary storage device 310 are managed by the OS 600.

The viewer processing unit 610 has a user interface function for displaying a user interface on the user output I/F 350. Display of a moving image or a still image from the monitoring camera 110, display of a moving image or a still image by a user operation, display of an accumulated image, display of a cut image, display of an image (display form) representing a direction in which a cut video moves, and the like are done by display of the user interface by the user interface function. Note that as the user interface, for example, a CUI (Character User Interface), a GUI (Graphical User Interface), a Web application, or the like can be applied.

The cutting control unit 620 performs processing of creating the cut image data 650 using the image data 640 saved in the secondary storage device 320. At this time, the cutting control unit 620 decides, based on the cut position data 660, which position on the image data 640 that is an omnidirectional video (fish-eye video) is to be cut, and creates an image with little distortion. Upon accepting, via the input device 331, a request event to change the cut position, the cutting control unit 620 changes the cut position and generates the cut image data 650 after the processing.

In this way, the cutting control unit 620 receives an event to, for example, manage the cut image data 650, thereby performing processing of generating the cut image data 650 from the image data 640.

The display control unit 630 executes processing of a flowchart according to this embodiment to be described later. For example, the display control unit 630 performs processing of displaying an omnidirectional video based on image data captured by the monitoring camera 110, a cut video, and a display form (an auxiliary line or the like) representing a moving enable position to which a cut video can move or a display form (an arrow or the like) representing a moving direction, which is superimposed on the omnidirectional video.

As shown in FIG. 6B, the cut image data 650 and the cut position data 660 are saved in the secondary storage device 320 as needed in place of the cut image data 450 and the cut position data 460 in the secondary storage device 220 of the monitoring camera 110. The cut image data 650, the cut position data 660, and the installation data 670 shown in FIG. 6B are the same data as the cut image data 450, the cut position data 460, and the installation data 470 shown in FIG. 4B.

<Examples of GUIs>

Figure 7A:
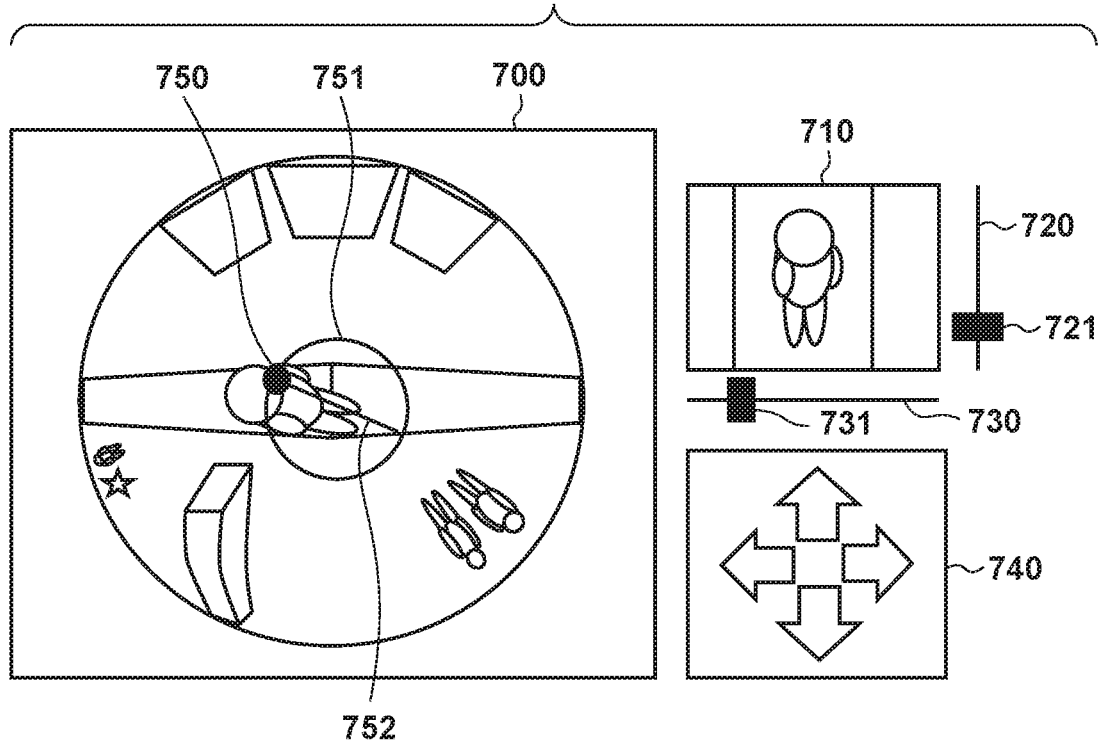
FIGS. 7A and 7B are views showing examples of GUIs displayed on a display screen.
Figure 7B:
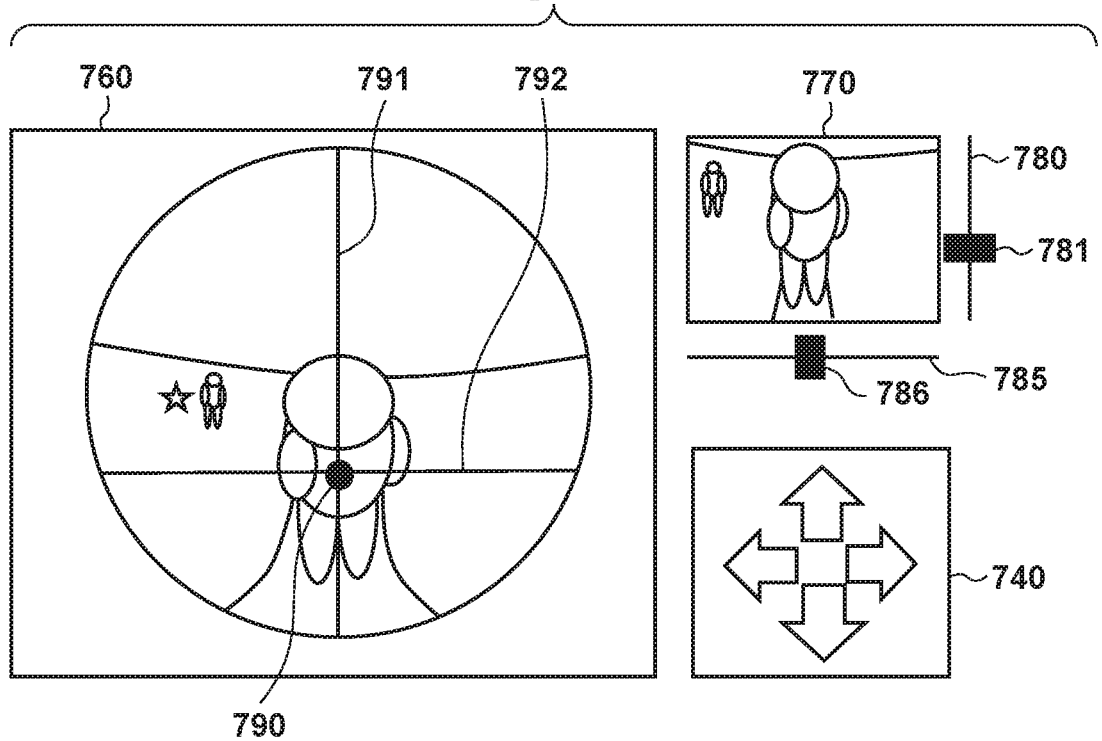

FIGS. 7A and 7B show examples of GUIs displayed on the output device 351. FIG. 7A shows an example of a GUI in a case in which the installation condition is ceiling mount. In an image data display region 700, the image data 440 obtained from the monitoring camera 110 is displayed. At this time, a center 750 of the cut position, a pan auxiliary line 751, and a tilt auxiliary line 752 are displayed on the image data 440 in the image data display region 700 in a superimposed manner.

Reference numeral 710 denotes a cut video display region in which cut image data obtained from the monitoring camera 110 is displayed. A tilt slider 720 representing the value of tilt of the current cut position is displayed. When a tilt knob 721 is moved using the input device 331 represented by a mouse or the like, the value of tilt of the cut position is changed. A pan slider 730 representing the value of pan of the current cut position is displayed. When a pan knob 731 is moved using the input device 331 represented by a mouse or the like, the value of pan of the cut position is changed. Reference numeral 740 denotes a button that controls pan and tilt by designating a direction. When the button 740 is pressed using the input device 331 represented by a mouse or the like, the values of pan and tilt of the cut position can be changed.

FIG. 7B shows an example of a GUI in a case in which the installation condition is wall mount. In an image data display region 760, image data obtained from the monitoring camera 110 is displayed. At this time, a center 790 of the cut position, a pan auxiliary line 792, and a tilt auxiliary line 791 are displayed on the image data in the image data display region 760 in a superimposed manner.

Reference numeral 770 denotes a cut video display region in which cut image data obtained from the monitoring camera 110 is displayed. A tilt slider 780 representing the value of tilt of the current cut position is displayed. When a tilt knob 781 is moved using the input device 331 represented by a mouse or the like, the value of tilt of the cut position is changed. A pan slider 785 representing the value of pan of the current cut position is displayed. When a pan knob 786 is moved using the input device 331 represented by a mouse or the like, the value of pan of the cut position is changed. Reference numeral 740 denotes the button that controls pan and tilt by designating a direction. When the button 740 is pressed using the input device 331 represented by a mouse or the like, the values of pan and tilt of the cut position can be changed.

The display examples shown in FIGS. 7A and 7B are implemented in accordance with, for example, transmission of a capturing start event from the video display apparatus 120 to the image capturing processing unit 410 of the monitoring camera 110 via the network 130. The image capturing processing unit 410 that has received the event obtains the image data 440 from the camera unit 231 by the image capture I/F 230, and transmits the image data 440 to the video display apparatus 120 via the network 130. Next, the display control unit 630 displays the received image data 440 as the image data 640 in the image data display region 700 or 760. In addition, the cutting control unit 620 loads the cut position data 660 and generates the cut image data 650 based on the information of the cut position data 660. Here, the generated cut image data 650 is saved in the secondary storage device 320, and the display control unit 630 displays it in the cut video display region 710 or 770.

<Processing>

Figure 8:
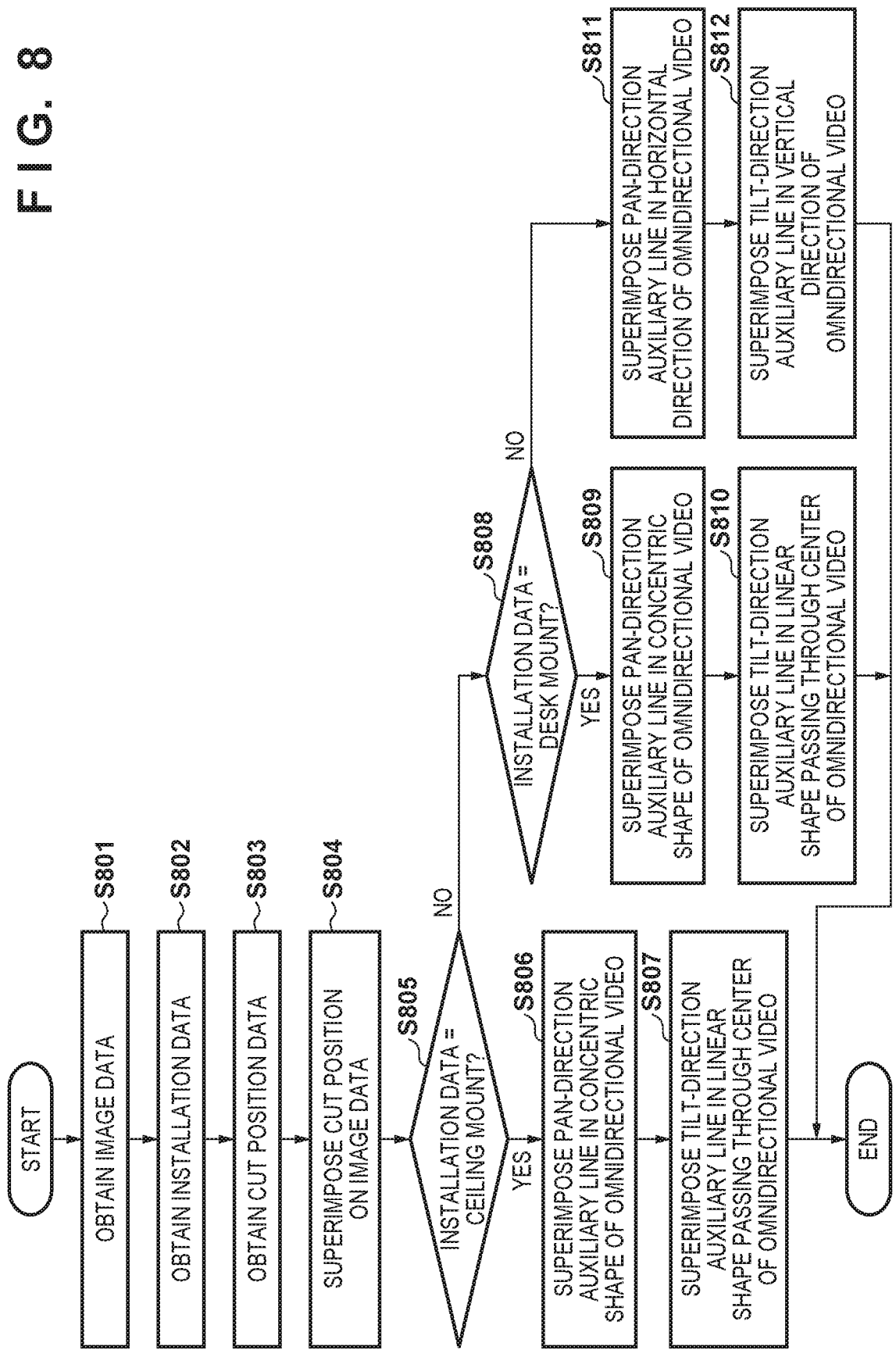
FIG. 8 is a flowchart showing the procedure of processing executed by the video display apparatus.

FIG. 8 is a flowchart showing an example of the procedure of processing executed by the video display apparatus 120 according to this embodiment. The flowchart show in FIG. 8 is performed when, for example, the CPU 300 of the video display apparatus 120 executes a program corresponding to the function of the display control unit 630 stored in the primary storage device 310 shown in FIG. 6A. Note that although processing executed by the video display apparatus 120 will be described below, the processing may be partially or wholly executed on the side of the monitoring camera 110.

In step S801, the display control unit 630 obtains the image data 640 that is an omnidirectional video. In step S802, the display control unit 630 obtains the installation data 670. In step S803, the display control unit 630 obtains the cut position data 660. In step S804, the display control unit 630 superimposes information (for example, the center 750 or 790 of the cut position) representing the current cut position on the obtained image data 640 based on the cut position data 660.

In step S805, the display control unit 630 determines whether the obtained installation data 670 corresponds to ceiling mount. If the installation data 670 corresponds to ceiling mount, the process advances to step S806. On the other hand, if the installation data 670 does not correspond to ceiling mount, the process advances to step S808. In step S806, the display control unit 630 superimposes, as information representing the moving direction of pan, a concentric auxiliary line (for example, the pan auxiliary line 751) with a radius corresponding to the distance between the current cut position and the fish-eye center on the image data 640 that is the omnidirectional video.

In step S807, the display control unit 630 superimposes, as information representing the moving direction of tilt, a linear auxiliary line (for example, the tilt auxiliary line 752) passing through the current cut position and the fish-eye center on the image data 640 that is the omnidirectional video. In step S808, the display control unit 630 determines whether the obtained installation data 670 corresponds to desk mount. If the installation data 670 corresponds to desk mount, the process advances to step S809. On the other hand, if the installation data 670 does not correspond to desk mount, it is determined that the installation data 670 corresponds to wall mount, and the process advances to step S811.

In step S809, the display control unit 630 superimposes, as information representing the moving direction of pan, a concentric auxiliary line (for example, the pan auxiliary line 751) with a radius corresponding to the distance between the current cut position and the fish-eye center on the image data 640 that is the omnidirectional video. In step S810, the display control unit 630 superimposes, as information representing the moving direction of tilt, a linear auxiliary line (for example, the tilt auxiliary line 752) passing through the current cut position and the fish-eye center on the image data 640 that is the omnidirectional video.

In step S811, the display control unit 630 superimposes, as information representing the moving direction of pan, a horizontal linear auxiliary line (for example, the pan auxiliary line 792) passing through the current cut position on the image data 640 that is the omnidirectional video. In step S812, the display control unit 630 superimposes, as information representing the moving direction of tilt, a vertical linear auxiliary line (an auxiliary line, for example, the tilt auxiliary line 791 in a direction to cross the horizontal linear auxiliary line) passing through the current cut position on the image data 640 that is the omnidirectional video. The series of processes shown in FIG. 8 has been described above. After the series of processes, the image data on which the auxiliary line representing the moving enable position is superimposed is output and displayed by the output device 351.

As described above, based on the installation data (for example, ceiling mount, desk mount, wall mount, or the like) representing the installation condition of the camera (for example, the monitoring camera 110), the image (the pan auxiliary line 751 or 792 or the tilt auxiliary line 752 or 791) representing the moving direction of the cut position on the omnidirectional video (for example, the image data 440 or 640) is switched and superimposed on the omnidirectional video.

More specifically, if the installation condition is ceiling mount or desk mount, as the image (display form) in a case in which the cut position of the cut video is moved by the pan operation, a concentric auxiliary line (pan auxiliary line 751) with respect to the center position of the omnidirectional video as a reference is superimposed on the omnidirectional video. In addition, as the image (display form) in a case in which the cut position of the cut video is moved by the tilt operation, a linear auxiliary line (tilt auxiliary line 752) passing through the center position of the omnidirectional video and the cut position of the cut video is superimposed on the omnidirectional video.

On the other hand, if the installation condition is wall mount, as the image (display form) in a case in which the cut position of the cut video is moved by the pan operation, a horizontal linear auxiliary line (pan auxiliary line 792) is superimposed on the omnidirectional video. In addition, as the image (display form) in a case in which the cut position of the cut video is moved by the tilt operation, a vertical linear auxiliary line (tilt auxiliary line 791) is superimposed on the omnidirectional video.

As described above, in this embodiment, an image (for example, a pan auxiliary line or a tilt auxiliary line) representing the moving direction of cut image data is displayed on image data that is an omnidirectional video in a superimposed manner.

This makes it possible to intuitively grasp the direction in which the current cut position can be moved on the image data (on the omnidirectional video) by a user operation in accordance with the installation condition.

Note that in addition to the various kinds of auxiliary lines (concentric circles and lines) each representing the moving direction of the cut position of the cut video on the omnidirectional video, a display form such as an arrow corresponding to the direction of pan/tilt (for example, a direction instructed by the user via the button 740 shown in FIGS. 7A and 7B) may further be displayed on the omnidirectional video in a superimposed manner. For example, when the upward direction of the button 740 is pressed, in the example shown in FIG. 7A, an arrow directed from the center position of the omnidirectional image to the position 750 is displayed. In the example shown in FIG. 7B, an upward arrow parallel to the tilt auxiliary line 791 is displayed. Additionally, the present invention is not limited to the arrangement that displays the display form together with the various kinds of auxiliary lines representing the moving direction of the cut position, and the display form (an arrow or the like) corresponding to the direction of pan/tilt may be displayed solely.

(Second Embodiment)
<Outline>

In the first embodiment, an example in which the display form (auxiliary line) representing the moving direction on the omnidirectional video is switched in accordance with the installation condition has been described. When this is executed, the user can execute intuitive pan/tilt control without being conscious of the installation condition. However, if a wrong installation condition is set, the user may be unable to know that the moving direction of pan/tilt on the omnidirectional video changes in accordance with the installation condition. As a solution to this, in this embodiment, an example in which when an installation condition is set, the user is notified that the moving direction of pan/tilt changes in accordance with the installation condition will be described.

For example, the user inputs an installation condition via an input device 331 represented by a mouse or the like of a video display apparatus 120. Upon accepting the input, the video display apparatus 120 obtains installation data 670 via a user input I/F 330 connected to the input device 331. The video display apparatus 120 transmits the installation data 670 to a monitoring camera 110 via a network 130. The monitoring camera 110 that has received the installation data 670 saves the installation data 670 as installation data 470.

<Processing>

Figure 9:
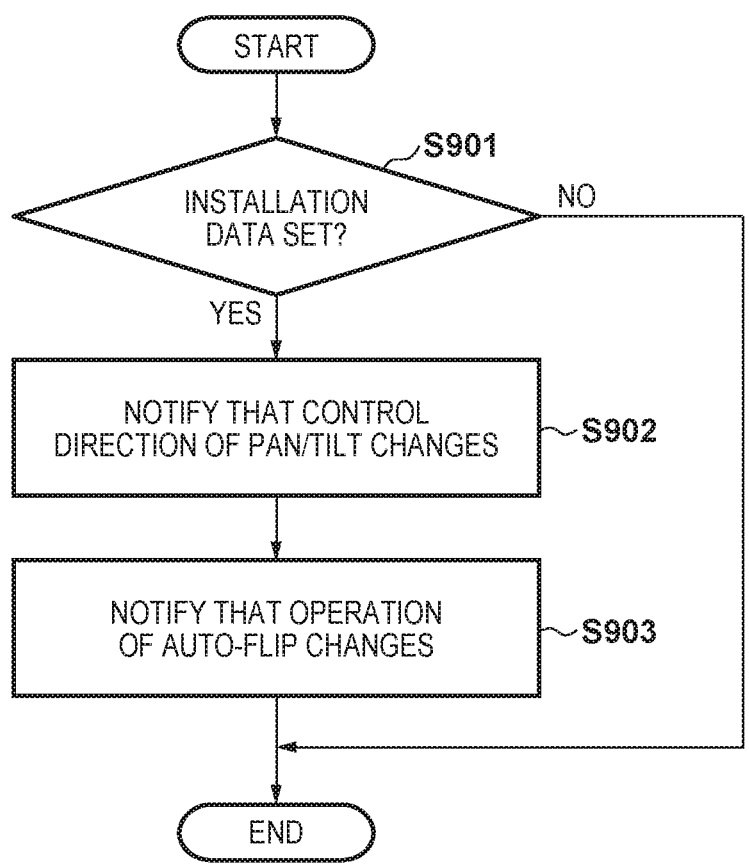
FIG. 9 is a flowchart showing the procedure of processing of notifying a change in the pan/tilt moving direction at the time of setting.

FIG. 9 is a flowchart showing an example of the processing procedure of the video display apparatus 120 when installation data is input. In step S901, the video display apparatus 120 determines whether installation data is set. If installation data is set, the process advances to step S902. On the other hand, if installation data is not set, the processing ends. In step S902, the video display apparatus 120 notifies that the moving direction of pan/tilt changes. In step S903, the video display apparatus 120 notifies that the operation of auto-flip (a change in the enable/disable state of an auto-flip function) changes.

The auto-flip function will be described below in detail. In this embodiment, in a case of an omnidirectional camera, the coordinate system is switched in accordance with the installation condition. As a result, the moving direction of pan/tilt changes in accordance with the installation condition. The auto-flip function exists concomitantly. The auto-flip function is a function of automatically (auto) vertically inverting (flip) a video at a predetermined position because the direction of the ceiling on a video changes depending on the installation condition. The enabled/disabled state of the auto-flip function also changes depending on the installation condition. When the installation condition is ceiling mount/desk mount, auto-flip is enabled because the position of the ceiling on a video changes depending on the position. In a case of wall mount, however, auto-flip is disabled because the position of the ceiling on a video is always constant. In this way, the enabled/disabled state of the auto-flip function is also notified in addition to the moving direction of pan/tilt.

<Examples of GUIs>

Figure 10A:
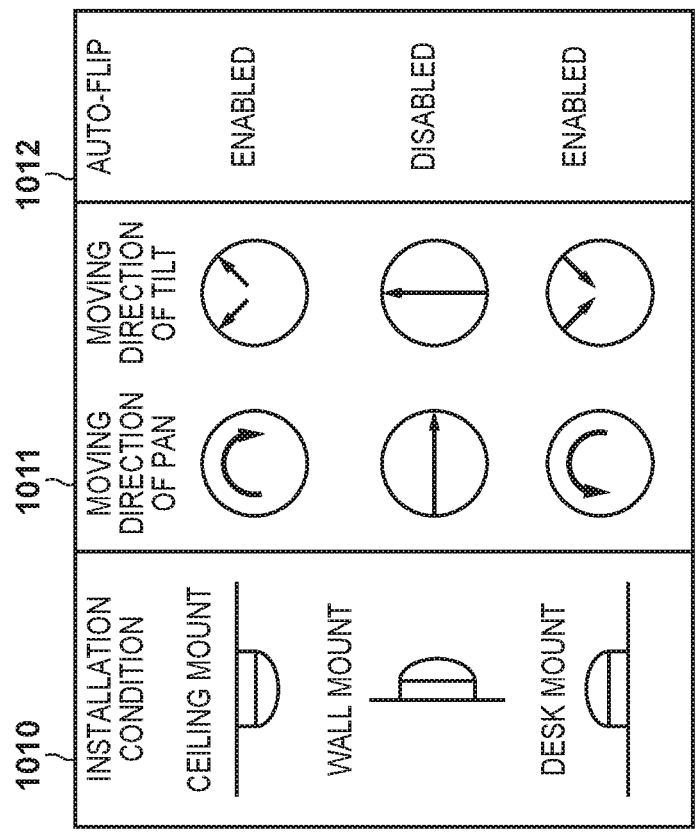
FIGS. 10A and 10B are views showing examples of GUIs configured to notify a change in the pan/tilt moving direction at the time of setting.
Figure 10B:
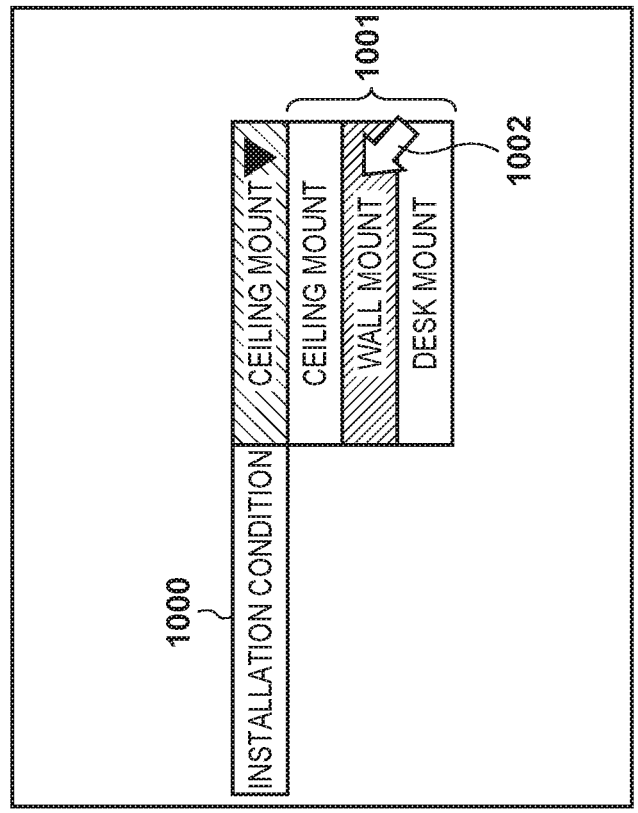

Here, FIGS. 10A and 10B show examples of GUIs. FIG. 10A shows a GUI used to set an installation condition. Reference numeral 1000 denotes an installation condition as a set item; 1001, options of the installation condition in which ceiling mount, desk mount, and wall mount are displayed; and 1002, a cursor that the user can move on the screen via a mouse that is a representative input device. The illustrated example shows a state in which the cursor 1002 is located on wall mount.

FIG. 10B shows an example of a GUI used when installation data is input in step S901. Reference numeral 1010 denotes an installation condition; 1011, a notification used to notify in step S902 that the moving direction of pan/tilt changes; and 1012, a notification used to notify in step S903 that the enabled/disabled state of auto-flip changes.

As described above, in this embodiment, when an installation condition is set, the user is notified that the moving direction of pan/tilt switches and that the enabled/disabled state of auto-flip switches. It is therefore possible to provide a user-friendly GUI.

Third Embodiment

<Outline>

In the second embodiment, an example in which when an installation condition is set, the user is notified that the moving direction of pan/tilt changes in accordance with the installation condition has been described. In the third embodiment, an example in which the user is notified of the enabled/disabled state of auto-flip in accordance with the installation condition will be described.

<Processing>

FIG. 11 is a flowchart showing an example of the processing procedure of a video display apparatus 120 when installation data is input. In step S1101, the video display apparatus 120 determines whether installation data is set. If installation data is set, the process advances to step S1102. On the other hand, if installation data is not set, the processing ends. In step S1102, the video display apparatus 120 determines whether the installation data corresponds to ceiling mount. If the installation data corresponds to ceiling mount, the process advances to step S1103. On the other hand, if the installation data does not correspond to ceiling mount, the process advances to step S1106.

In step S1103, the video display apparatus 120 notifies that pan moves concentrically on an omnidirectional video. At this time, the moving direction may also be notified. In step S1104, the video display apparatus 120 notifies that tilt moves on a line passing through the center on an omnidirectional video. At this time, the moving direction may also be notified. In step S1105, the video display apparatus 120 notifies that auto-flip is enabled.

In step S1106, the video display apparatus 120 determines whether the installation data corresponds to desk mount. If the installation data corresponds to desk mount, the process advances to step S1107. On the other hand, if the installation data does not correspond to desk mount, it is determined that the installation data corresponds to wall mount, and the process advances to step S1110. In step S1107, the video display apparatus 120 notifies that pan moves concentrically on an omnidirectional video. At this time, the moving direction may also be notified. However, the concentric moving direction of pan is a direction opposite to that in the case of ceiling mount.

In step S1108, the video display apparatus 120 notifies that tilt moves on a line passing through the center on an omnidirectional video. At this time, the moving direction may also be notified. However, the moving direction of tilt on the line is a direction opposite to that in the case of ceiling mount. In step S1109, the video display apparatus 120 notifies that auto-flip is enabled. In step S1110, the video display apparatus 120 notifies that pan moves in the horizontal direction on an omnidirectional video.

In step S1111, the video display apparatus 120 notifies that tilt moves in the vertical direction on an omnidirectional video. In step S1112, the video display apparatus 120 notifies that auto-flip is disabled. The series of processes shown in FIG. 11 thus ends.

<Examples of GUIs>

Figure 12A:
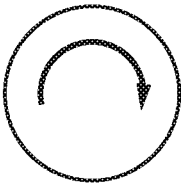
FIGS. 12A to 12C are views showing examples of GUIs configured to notify enabling/disabling of auto-flip.
Figure 12B:
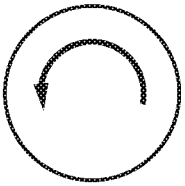
Figure 12C:
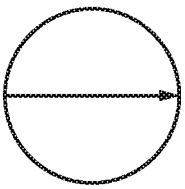

FIGS. 12A to 12C show examples of GUIs according to this embodiment. FIG. 12A shows an example in which the installation condition is ceiling mount, FIG. 12B shows an example in which the installation condition is desk mount, and FIG. 12C shows an example in which the installation condition is wall mount. Reference numeral 1200 denotes an installation condition as a set item; 1201, a moving direction of pan/tilt that is an item of the current state; and 1202, an enabled/disabled state of auto-flip that is an item of the current state.

FIG. 12A shows an example in which the installation condition is ceiling mount, that is, an example in a case in which the installation data is ceiling mount in step S1102 of FIG. 11, and ceiling mount is displayed by 1203. In addition, the moving direction of pan/tilt is notified by a display form as indicated by 1204 (steps S1103 and S1104). Furthermore, 1205 represents that auto-flip is enabled (step S1105).

FIG. 12B shows an example in which the installation condition is desk mount, that is, an example in a case in which the installation data is desk mount in step S1106 of FIG. 11, and desk mount is displayed by 1213. In addition, the moving direction of pan/tilt is notified by a display form as indicated by 1214 (steps S1107 and S1108). Furthermore, 1215 represents that auto-flip is enabled (step S1109).

FIG. 12C shows an example in which the installation condition is wall mount, that is, an example in a case in which the installation data is not desk mount in step S1106 of FIG. 11, and wall mount is displayed by 1223. In addition, the moving direction of pan/tilt is notified by a display form as indicated by 1224 (steps S1110 and S1111). Furthermore, 1225 represents that auto-flip is disabled (step S1112).

As described above, in this embodiment, the user is notified, via a GUI or the like, of the enabled or disabled state of auto-flip in accordance with the installation condition. This allows the user to easily grasp the state of auto-flip.

(Fourth Embodiment)

<Outline>

In the second embodiment, an example in which when an installation condition is set, the user is notified that the moving direction of pan/tilt changes in accordance with the installation condition has been described. In the fourth embodiment, an example in which when a help button is pressed, the user is notified that the moving direction of pan/tilt changes will be described. For example, when the user clicks on a help button displayed on an output device 351 via an input device 331 represented by a mouse or the like of a video display apparatus 120, the input of the help operation is accepted.

<Processing>

Figure 13:
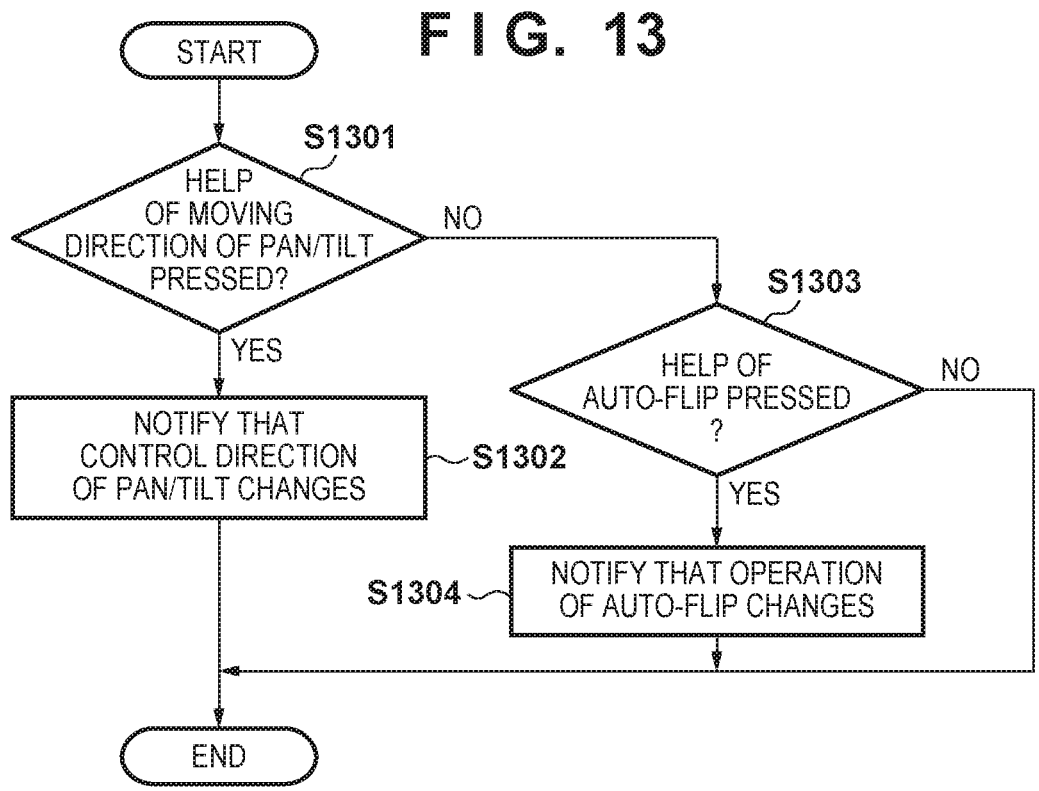
FIG. 13 is a flowchart showing the procedure of processing of notifying a change in the pan/tilt moving direction at the time of a help operation.

FIG. 13 is a flowchart showing the processing procedure of the video display apparatus 120 when a help operation is input. In step S1301, the video display apparatus 120 determines whether the help of the moving direction of pan/tilt is pressed. If the help of the moving direction of pan/tilt is pressed, the process advances to step S1302. On the other hand, if the help of the moving direction of pan/tilt is not pressed, the process advances to step S1303. In step S1302, the video display apparatus 120 notifies the user, using the output device 351 via a user output I/F 350, that the moving direction of pan/tilt changes.

In step S1303, the video display apparatus 120 determines whether the help of auto-flip is pressed. If the help of auto-flip is pressed, the process advances to step S1304. On the other hand, if the help of auto-flip is not pressed, the processing ends. In step S1304, the video display apparatus 120 notifies the user, using the output device 351 via the user output I/F 350, that the operation of auto-flip changes. The series of processes shown in FIG. 13 thus ends.

<Example of GUI>

Figure 14:
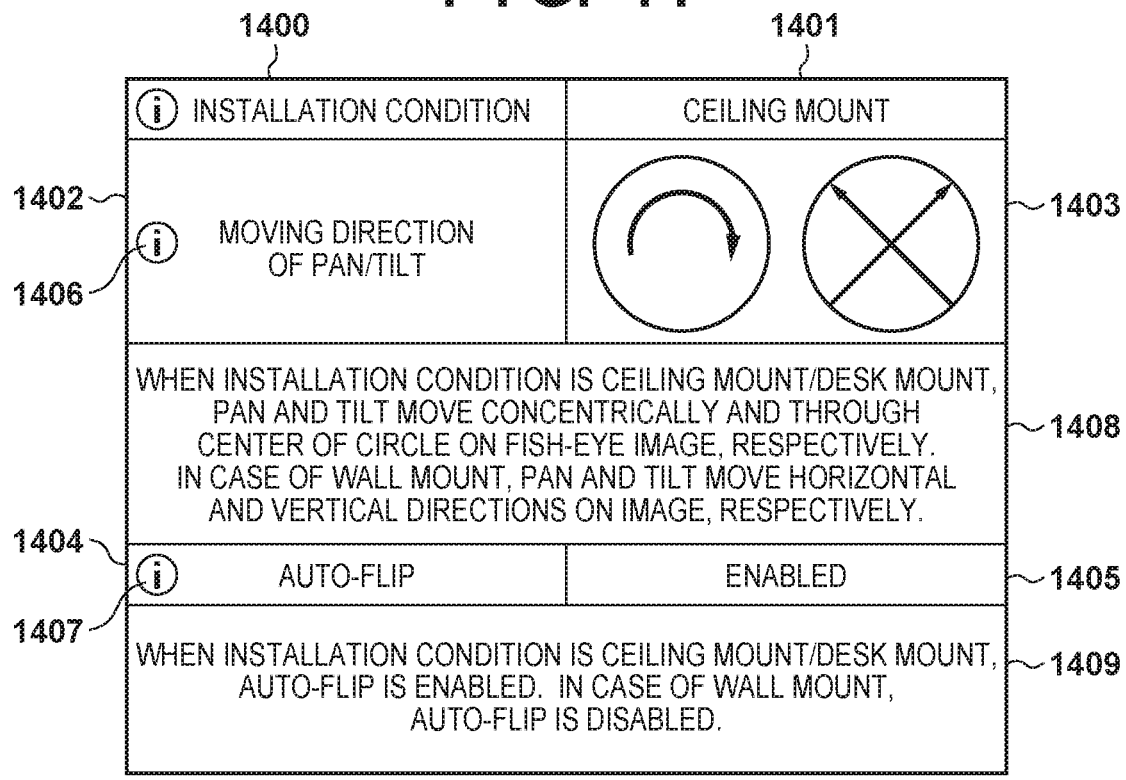
FIG. 14 is a view showing an example of a GUI configured to notify a change in the pan/tilt moving direction at the time of a help operation.

FIG. 14 shows an example of a GUI according to this embodiment. Reference numeral 1400 denotes an installation condition as a set item; and 1401, a current setting of the installation condition which is ceiling mount in the example shown in FIG. 14. Reference numeral 1402 denotes a moving direction of pan/tilt as an item corresponding to the installation condition. The state of the moving direction is shown by a display form as indicated by 1403. In addition, reference numeral 1404 denotes an item of auto-flip; and 1405, a state of auto-flip. Reference numeral 1406 denotes a help operation button of pan/tilt, and 1408, a notification configured to notify in step S1301 of the flowchart of FIG. 13 that the help operation button is pressed and in step S1302 that the pan/tilt control method changes. Similarly, reference numeral 1407 denotes a help button of auto-flip, and 1409, a notification configured to notify in step S1303 of the flowchart of FIG. 13 that the help operation button is pressed and in step S1304 that the operation of auto-flip changes.

As described above, the user is notified, in accordance with pressing of the help operation button, that the moving direction of pan/tilt switches and that the enabled/disabled state of auto-flip switches. It is therefore possible to provide a user-friendly GUI.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-072081, filed Mar. 31, 2017, which is hereby incorporated by reference herein in its entirety.

What is claimed is:

1. A video display apparatus comprising:
one, or ore processors: and
a memory coupled to the one or more processors and including instructions stored thereon that, when executed by the one or more processors, cause the video display apparatus to function as:
an obtaining unit configured to obtain installation data representing an installation condition of a camera;
a first accepting unit configured to accept an operation for moving, in a first direction, a cut position of a cut video obtained by cutting a part of a fish-eye video captured by the camera;
a second accepting unit configured to accept an operation for moving the cut position in a second direction different from the first direction; and
a control unit configured to, based on the installation data, switch an object representing a moving direction of the cut position on the video, the object being an object superimposed on the fish-eye video,
wherein, the object is an object corresponding to one of the first direction and the second direction,
wherein in a case where the installation condition is a first installation condition to install the camera to capture a lower side from above or a second installation condition to install the camera to capture an upper side from below,
the object corresponding to the first direction is a circular object, and
the object corresponding to the second direction is a linear object passing through a center of the fish-eye video and the cut position of the cut video.

2. The apparatus according to claim 1, wherein the operation for moving in the first direction is a pan operation, and the operation for moving in the second direction is a tilt operation.

3. A control method of a video display apparatus including a first accepting unit configured to accept an operation for moving, in a first direction, a cut position of a cut video obtained by cutting a part of a fish-eye video captured by a camera and a second accepting unit configured to accept an operation for moving the cut position in a second direction different from the first direction, the method comprising:
obtaining installation data representing an installation condition of the camera; and
switching an object representing a moving direction of the cut position on the video, based on the installation data, the object being an object superimposed on the fish-eye video,
wherein the object is an object corresponding to one of the first direction and the second direction,
wherein in a case where the installation condition is a first installation condition to install the camera to capture a lower side from above or a second installation condition to install the camera to capture an upper side from below,
the object corresponding to the first direction is a circular object, and
the object corresponding to the second direction is a linear object passing through a center of the fish-eye video and the cut position of the cut video.

4. A video display apparatus comprising:
one or more processors; and
a memory coupled to the one or more processors and including instructions stored thereon that, when executed by the one or more processors, cause the video display apparatus to function as:

an obtaining unit configured to obtain installation data representing an installation condition of a camera;

a first accepting unit configured to accept an operation for moving, in a first direction, a cut position of a cut video obtained by cutting a part of a fish-eye video captured by the camera, a second accepting unit configured to accept an operation for moving the cut position in a second direction different from the first direction; and a control unit configured to, based on the installation data, switch an object representing a moving direction of the cut position on the video, the object being an object superimposed on the fish-eye video, wherein the object is an object corresponding to one of the first direction and the second direction, wherein in a case where the installation condition is an installation condition to install the camera to capture in a horizontal direction, the object corresponding to the first direction is a horizontal linear object passing through the cut position of the cut video, and the object corresponding to the second direction is a vertical linear object passing through the cut position of the cut video and crossing the horizontal direction.

5. The apparatus according to claim 4, wherein the operation for moving in the first direction is a pan operation, and the operation for moving in the second direction is a tilt operation.

6. A video display apparatus comprising:
one or more processors; and
a memory coupled to the one or more processors and including instructions stored thereon that, when executed by the one or more processors, cause the video display apparatus to function as:
an obtaining unit configured to obtain installation data representing an installation condition of a camera;
a first accepting unit configured to accept an operation for moving, in a first direction, a cut position of a cut video obtained by cutting a part of a fish-eye video captured by the camera,
a second accepting unit configured to accept an operation for moving the cut position in a second direction different from the first direction; and
an outputting unit configured to output, if a help operation is accepted, information indicating that the moving direction of the cut video on the fish-eye video corresponding to one of the first direction and the second direction changes, in accordance with the setting of the installation data.

7. The apparatus according to claim 6, wherein the operation for moving in the first direction is a pan operation, and the operation for moving in the second direction is a tilt operation.

8. A video display apparatus comprising:
one or more processors; and
a memory coupled to the one or more processors and including instructions stored thereon that, when executed by the one or more processors, cause the video display apparatus to function as:
an obtaining unit configured to obtain installation data representing an installation condition of a camera;
an accepting unit configured to accept an operation for moving a cut position of a cut video obtained by cutting a part of a fish-eye video captured by the camera; and
an outputting unit configured to output information indicating that an auto-flip function related to a display of the cut video is switched between an enabled state and a disabled state, in accordance with the setting of the installation data.

9. A control method of a video display apparatus including an first accepting unit configured to accept an operation for moving, in a first direction, a cut position of a cut video obtained by cutting a part of a fish-eye video captured by a camera, and a second accepting unit configured to accept an operation for moving the cut position in a second direction different from the first direction, the method comprising:
obtaining installation data representing an installation condition of the camera; and
switching an object representing a moving direction of the cut position on the video, based on the installation data, the object being an object superimposed on the fish-eye video,
wherein the object is an object corresponding to one of the first direction and the second direction,
wherein in a case where the installation condition is an installation condition to install the camera to capture in a horizontal direction,
the object corresponding to the first direction is a horizontal linear object passing through the cut position of the cut video, and
the object corresponding to the second direction is a vertical linear object passing through the cut position of the cut video and crossing the horizontal direction.

10. A control method of a video display apparatus including an first accepting unit configured to accept an operation for moving, in a first direction, a cut position of a cut video obtained by cutting a part of a fish-eye video captured by a camera, and a second accepting unit configured to accept an operation for moving the cut position in a second direction different from the first direction, the method comprising:
obtaining installation data representing an installation condition of the camera; and
outputting, if a help operation is accepted, information indicating that the moving direction of the cut video on the fish-eye video corresponding to one of the first direction and the second direction changes, in accordance with the setting of the installation data.

11. A control method of a video display apparatus including an accepting unit configured to accept an operation for moving a cut position of a cut video obtained by cutting a part of a fish-eye video captured by a camera, the method comprising:
obtaining installation data representing an installation condition of the camera; and
outputting information indicating that an auto-flip function related to a display of the cut video is switched between an enabled state and a disabled state, in accordance with the setting of the installation data.

12. A non-transitory computer-readable storage medium storing a computer program for causing a computer to execute a control method of a video display apparatus including a first accepting unit configured to accept an operation for moving, in a first direction, a cut position of a cut video obtained by cutting a part of a fish-eye video captured by a camera and a second accepting unit configured to accept an operation for moving the cut position in a second direction different from the first direction, the method comprising:
obtaining installation data representing an installation condition of the camera; and switching an object representing a moving direction of the cut position on the video, based on the installation data, the object being an object superimposed on the fish-eye video,
wherein the object is an object corresponding to one of the first direction and the second direction,
wherein in a case where the installation condition is a first installation condition to install the camera to capture a lower side from above or a second installation condition to install the camera to capture an upper side from below,
the object corresponding to the first direction is a circular object, and
the object corresponding to the second direction is a linear object passing through a center of the fish-eye video and the cut position of the cut video.

13. A non-transitory computer-readable storage medium storing a computer program for causing a computer to execute a control method of a video display apparatus including an first accepting unit configured to accept an operation for moving, in a first direction, a cut position of a cut video obtained by cutting a part of a fish-eye video captured by a camera, and a second accepting unit configured to accept an operation for moving the cut position in a second direction different from the first direction, the method comprising:
obtaining installation data representing an installation condition of the camera; and
switching an object representing a moving direction of the cut position on the video, based on the installation data, the object being an object superimposed on the fish-eye video,
wherein the object is an object corresponding to one of the first direction and the second direction,
wherein in a case where the installation condition is an installation condition to install the camera to capture in a horizontal direction,
the object corresponding to the first direction is a horizontal linear object passing through the cut position of the cut video, and
the object corresponding to the second direction is a vertical linear object passing through the cut position of the cut video and crossing the horizontal direction.

14. A non-transitory computer-readable storage medium storing a computer program for causing a computer to execute a control method of a video display apparatus including an first accepting unit configured to accept an operation for moving, in a first direction, a cut position of a cut video obtained by cutting a part of a fish-eye video captured by a camera, and a second accepting unit configured to accept an operation for moving the cut position in a second direction different from the first direction, the method comprising:
obtaining installation data representing an installation condition of the camera; and
outputting, if a help operation is accepted, information indicating that the moving direction of the cut video on the fish-eye video corresponding to one of the first direction and the second direction changes, in accordance with the setting of the installation data.

15. A non-transitory computer-readable storage medium storing a computer program for causing a computer to execute a control method of a video display apparatus including an accepting unit configured to accept an operation for moving a cut position of a cut video obtained by cutting a part of a fish-eye video captured by a camera, the method comprising:
obtaining installation data representing an installation condition of the camera; and
outputting information indicating that an auto-flip function related to a display of the cut video is switched between an enabled state and a disabled state, in accordance with the setting of the installation data.

16. The apparatus according to claim 8, wherein the outputting unit outputs the information in accordance with acceptance of a help operation.

\* \* \* \* \*